United States Patent [19]
Frisby et al.
[11] Patent Number: 4,608,891
[45] Date of Patent: Sep. 2, 1986

[54] METHOD AND APPARATUS FOR CUTTING A PATTERN IN MATERIAL

[75] Inventors: Thomas M. Frisby, Bellvue; Gordon L. Brooks, Fort Collins, both of Colo.

[73] Assignee: ESAB North America, Incorporated, Fort Collins, Colo. ; a part interest

[21] Appl. No.: 636,176

[22] Filed: Jul. 31, 1984

[51] Int. Cl.[4] .......... D06H 7/00; G06F 15/46

[52] U.S. Cl. .......... 83/56; 83/881; 83/698; 83/925 CC; 384/26

[58] Field of Search .......... 83/879–887, 83/56, 698, 71, 747, 925 CC, 663, 676; 33/18 R; 308/6 R, 6 B, 173; 409/231

[56] References Cited

U.S. PATENT DOCUMENTS

| | | | |
|---|---|---|---|
| 2,314,327 | 3/1943 | Drake | 83/886 |
| 2,744,329 | 5/1956 | Way et al. | 33/18 R |
| 2,803,877 | 8/1957 | Belanger | 30/317 |
| 2,810,960 | 10/1957 | Johnson et al. | 33/18 |
| 2,902,760 | 9/1959 | Koenig | 30/164.9 |
| 2,902,761 | 9/1959 | Koenig | 30/164.9 |
| 3,555,950 | 1/1971 | Gijsbers et al. | 83/171 |
| 3,726,019 | 4/1973 | Adler | 33/18 R |
| 3,850,063 | 11/1974 | Witkowski | 83/886 |
| 4,373,412 | 2/1983 | Gerber et al. | 83/71 X |
| 4,392,404 | 7/1983 | Schwarzenberg | 83/881 X |

OTHER PUBLICATIONS

Brochure–Tech Data GXA Hawk, ESAB Heath Gas Cutting Division, Form No. 812–1.

*Primary Examiner*—James M. Meister
*Assistant Examiner*—John L. Knoble
*Attorney, Agent, or Firm*—Sheridan, Ross & McIntosh

[57] ABSTRACT

A system for automatically cutting a pattern in a material wherein a cutting blade is rotatably mounted in a holder which is also rotatably mounted in a tube. The holder also has limited linear movement in each direction within the tube. The tube is mounted to computer controlled apparatus and is moved in the desired pattern over the material to cut the pattern in the material.

4 Claims, 5 Drawing Figures

METHOD AND APPARATUS FOR CUTTING A PATTERN IN MATERIAL

FIELD OF THE INVENTION

This invention relates generally to method and apparatus for reproducing a pattern at a predetermined location, more particularly to method and apparatus for cutting a pattern in a material and more specifically to method and apparatus for cutting a pattern in a material that is thereafter used in the construction of a sign.

BACKGROUND OF THE INVENTION

It is a common commercial practice to create a pattern by providing a working tool at a predetermined location on material and then moving the working tool through a predetermined sequence of steps along the material to generate the pattern. In creating such a pattern, it is known to utilize a controlling apparatus wherein a program for providing a desired pattern is stored therein. Initiation of the program causes the working tool to move along the programmed, predetermined path under the control of the controlling apparatus in order to provide the desired pattern. A particular commercial operation incorporating such a predetermined pattern-forming process relates to the construction of signs. One known method of sign formation using a programmed controller uses a conventional swivel knife as the working tool. The swivel knife is controllablely moved through a thin top layer of polyvinyl chloride which is located on top of another layer of polyvinyl chloride. The sign indicia are formed as the knife cuts through portions of the thin polyvinyl chloride layer. This known method of operation for forming a predetermined pattern using a swivel knife has certain drawbacks relating to the movement of the swivel knife. Because of the frequent changes in the direction of the swivel knife or working tool, as the characters of a pattern are created or cut, it is desirable to provide a substantially friction free working tool movement, which is not achieved when using a conventional swivel knife. Relatedly, such friction free movement would result in a greater rate of movement of the swivel knife or working tool and thereby increase the speed of pattern formation or cutting. Accordingly, it would be advantageous to provide an improved method and apparatus for forming a predetermined pattern in which the swivel knife or working tool moves more rapidly due to minimal friction.

BRIEF SUMMARY OF THE INVENTION

This invention provides method and apparatus for cutting a pattern in a material wherein a cutting instrument is positioned in contact with the material to be cut and then is moved through a pattern and at the same time cuts the pattern in the material.

In a preferred embodiment of the invention, the material to be cut is supported on a surface and positioned at a predetermined location. A cutting instrument is supported in an apparatus which moves over the material to be cut in response to signals from a computer to reproduce over the material a pattern which has been programmed into the computer. As the cutting instrument moves with the apparatus, it cuts the pattern in the material. The cutting instrument is rotatably mounted in a holder for rotation about a longitudinal axis. The holder is mounted in substantially frictionless bearing means in the apparatus for rotation about and for linear movement along the same longitudinal axis. This mounting of the cutting instrument results in substantially friction free movement to permit the rapid changes in the direction of movement necessary to follow the pattern being cut in the material. Also this mounting allows patterns to be cut in the material at rates as high as 250 inches per minute. A force is applied to the cutting instrument in an amount sufficient to cause the cutting instrument to penetrate only the material to be cut and remains substantially constant during operation of the instrument.

It is an object of this invention to cut a pattern in a material using an automated process.

It is another object of this invention to provide a cutting instrument which responds substantially instantaneously to make a change in cutting direction.

It is another object of this invention to provide a cutting instrument which is mounted for substantially friction free movement in both rotational and linear directions.

It is a further object of this invention to improve the reliability of a knife edge turning response by use of a double bearing configuration.

It is yet another object of this invention to provide a cutting instrument wherein the force causing the cutting instrument to penetrate through the material to be cut remains substantially constant during operation of the cutting instrument.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

DETAILED DESCRIPTION OF THE INVENTION

Figures 1, 1A, 2:
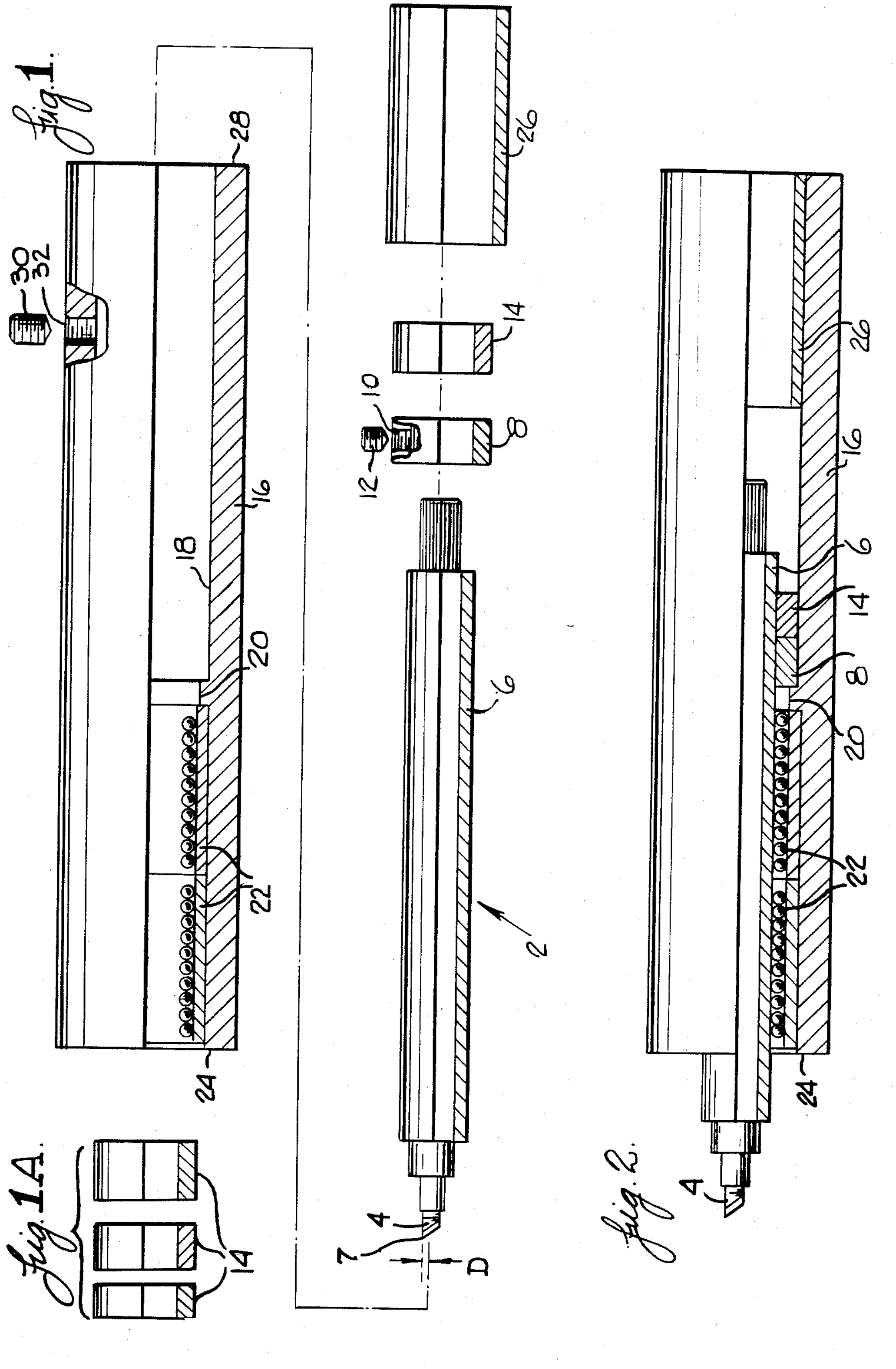
FIG. 1 is an exploded view with parts in section illustrating some of the components of this invention.
FIG. 1A is a view with parts in section of various sizes of weights.
FIG. 2 is an assembled view of FIG. 1 with the cutting assembly in position above the material to be cut.

A cutting assembly is illustrated in FIGS. 1 and 2 and comprises a swivel knife 2 in which a cutting blade 4 thereof is rotatably mounted in a holder 6 using bearings (not shown). In the preferred embodiment, the tip or point 7 of the cutting blade 4 is offset by a minimal distance D from the longitudinal center line of the swivel knife 2 for reasons to be noted later.

The holder 6 has a generally cylindrical outer surface. A stop collar 8 has an inner surface shaped similarly to the outer surface of the holder 6 so that the stop collar 8 may be moved over the outer surface of the holder 6. The stop collar 8 is provided with a threaded opening 10 so that a set screw 12 may be used to secure the stop collar 8 at a desired position on the holder 6, as explained below. A plurality of weights 14, each having a different value, as illustrated by the various sizes in FIG. 1A, are provided and each weight 14 has an inner surface shaped similarly to the outer surface of the holder 6 so that as many weights 14 as desired may be placed over the holder 6 and moved into contact with the stop collar 8.

As further illustrated in FIGS. 1 and 2, the cutting assembly also includes an elongated hollow tube 16 having a generally cylindrical inner surface 18. An annular projection 20 extends inwardly from the inner surface 18. Substantially frictionless bearing means 22, such as the ball bearings illustrated in FIGS. 1 and 2, are secured to the inner surface 18 and are located between the projection 20 and one end 24 of the tube 16. The inner diameter of the bearing means 22 corresponds to the outer diameter of the holder 6 so that in assembled relationship the holder 6 is in contact with the bearing means 22. This relationship permits the holder 6 to rotate relative to the bearing means 22 and also to move in a linear direction relative to the bearing means 22. In the preferred embodiment, ball bearings are used to provide the frictionless bearing means but it is to be understood that any type of frictionless bearing can be used as long as it permits the rotational and linear movements to be substantially friction free. Since the linear movement is substantially friction free, the force on the knife blade, as determined by the weights 14, will remain substantially constant during operation of the cutting assembly. Also, if the self contained rotational means of the swivel knife should stick, the frictionless bearing means will permit rotation of the knife. The combined self contained rotational means of the swivel knife and the frictionless bearing means allows the swivel knife to change directions instantaneously. A hollow cylindrical sleeve 26 is inserted into the other end 28 of the tube 16 and is retained in a desired position by a set screw 30 in the threaded opening 32. The sleeve 28 cooperates with the weights 14 and the stop collar 8 to prevent the holder 6 from moving out of the tube 16.

Figure 3:
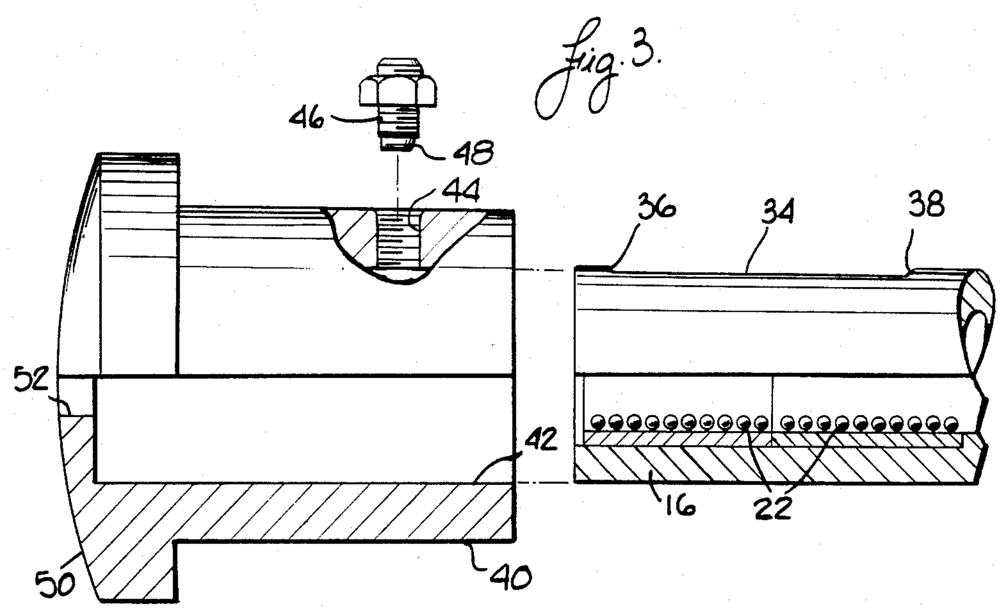
FIG. 3 is a view with parts in section of a modification of the invention.

A modification of the invention is illustrated in FIG. 3 wherein the tube 16 is provided with a keyway 34 having stop shoulders 36 and 38. A hollow-weighted smoothing foot 40, having an inner surface 42 corresponding to the outer surface of the tube 16, is positioned over the tube 16. A threaded opening 44 in the foot 40 is aligned over the keyway 34 and a set screw 46 is secured in the threaded opening 44 so that the tip 48 of the set screw 46 lies in the keyway 34. The set screw 46 is adjusted so that the tip 48 lies in the keyway 34 but does not contact the base of the keyway 34 so as to permit relative linear movement between the foot 40 and the tube 16. Rotational movement between the foot 40 and the tube 16 is prevented by contact between the tip 48 and the sides of the keyway 34. The foot 40 has a surface 50 having a generally hemispherical configuration which surface contacts the material to be cut. The foot 40 has an opening 52 extending therethrough to provide a passageway for the holder 6. The foot 40 functions to smooth the surface of the material to be cut.

Figure 4:
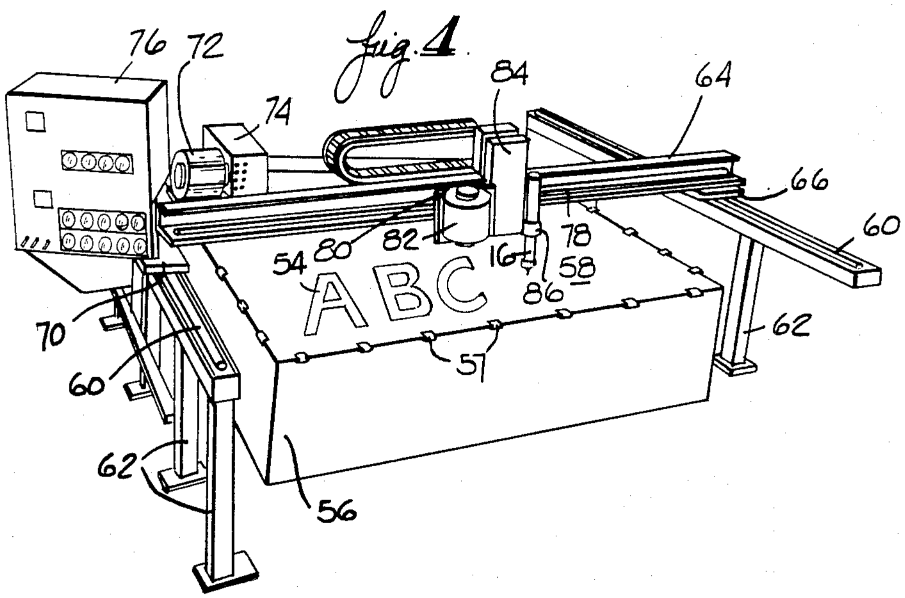
FIG. 4 is a view illustrating the cutting of a pattern.

Apparatus for moving the cutting assembly over the material to be cut is illustrated in FIG. 4. A sheet 54 of material, such as polyvinyl chloride, is stretched over a frame 56 and secured in position by suitable means such as the clips 57. The material 58 to be cut may comprise a water soluble masking material sprayed over the sheet 54 and dried, such as a thin polyvinyl chloride sheet secured to the sheet 54 or other similar materials. The frame 56 is located between a pair of parallel rails 60 which are mounted on fixed supports 62. A beam 64 extends between the rails 60. A carriage 66 is mounted on one end of the beam and is provided with means permitting movement of the beam 64 over the associated rail 60. At the other end of the beam 64, there is mounted a carriage 70 that is provided with means permitting movement of the beam 64 over the associated rail 60, drive means 72 for moving the carriage 70 in each direction over the associated rail 60, and a drive control means 74 which receives signals from the computer 76 and responds by operating drive means 72 to move the carriage 70 in the proper direction. A rail 78 is mounted on the beam 64 and a carriage 80, having means permitting movement of the carriage 80 in each direction over the rail 78, is positioned on the rail 78 and provided with drive means 82 for moving the carriage 80 over the rail 78. Mounted on the carriage 80 for movement therewith are the drive means 82 and a drive control means 84 which receives signals from the computer 76 and responds by operating the drive means 82 to move the carriage 80 in the proper direction. A member 86, in which the tube 16 is mounted, is also mounted on the carriage 80 so that it may move each way in a vertical direction relative to the beam 64 in response to a signal from the computer 76. The computer 76 is mounted on the beam 64 for movement therewith and provides the signals to move the carriages 70 and 66 over the rails 60; the carriage 80 over the rail 68; and the member 86 so that the cutting blade 4 moves into and out of contact with the material to be cut and cuts the desired pattern in the material 58.

When it is desired to cut a pattern in a material, the cutting assembly 2 is assembled as illustrated in FIGS. 1 and 2. The stop collar 8 is placed over the holder 6 and secured at a desired location by tightening the set screw 12. The desired location for the stop collar 8 is selected so that, when the cutting assembly is in cutting position, the stop collar 8 is spaced a distance above projection 20 and the top weight 14 is spaced a distance below the sleeve 26. The desired number of weights 14 are placed over the holder 6. The number of weights utilized depends on the material to be cut and the sharpness of the blade 4 and is chosen so that the blade 4 penetrates only the material to be cut. The holder 6 is inserted into the tube 16 until the stop collar 8 abuts against the projection 20. The sleeve 26 is then inserted into the tube 16 and secured at a desired location by tightening the set screw 30. As described above, the outer surface of the holder 6 is in contact with the substantially frictionless bearing means 22 so that holder 6 may freely rotate relative to the tube 16. Also, the cutting blade 4 rotates freely relative to the holder 6 due to the bearings provided in the holder 6 around portions of a shaft of the cutting blade 4.

By such a double bearing configuration, the cutting blade 4 is able to reliably and substantially instantaneously follow a desired contoured path. That is, the cutting blade 4 immediately pivots in response to predetermined changes in the path of travel to keep the sharp edge of the cutting blade 4 in the desired direction. For example, to achieve quality cutting of signs, the distance D of the offset should be at a minimum so that an immediate turning response of the cutting blade is provided. This result occurs because the turning effort or torque associated with the cutting edge is proportional to the offset distance D. Further, because of the minimal offset distance D obtained in the present invention, the radius of any corner generated during cutting of a sign is also minimized thereby improving the quality of appearance of the sign. In order to assure reliability of operation, in conjunction with an immediate turning response and a minimal offset, however, the double bearing configuration must be used so that if one set of bearings is not properly functioning, the other set of bearings is able to provide a proper turning response. With the present invention, the distance D is about 0.012 inches while a conventional swivel knife has a distance D of about 0.046 inches.

The mounting of the holder 6 in the bearing means 22 also provides for substantially friction free linear movement of the holder 6. As a result of this substantially friction free movement, as explained above, the force on the knife blade remains substantially constant during operation of the cutting assembly. As illustrated in FIG. 2, the linear movement is limited by contact of the stop collar 8 and the projection 20 or by contact of the weight 14 and the sleeve 26. The tube 16 is then secured in the member 86 on the carriage 80.

The frame 56 having the material 58 to be cut secured thereto is positioned at a predetermined location between the rails 60. The pattern to be cut has been programmed into the computer 76. The apparatus is turned on and the computer 74 sends out signals to move the carriages 70 and 66 over the rails 60 and the carriage 80 over the rail 78 while holding the cutting blade 4 in an up position out of contact with the material 58. When the cutting blade is in a predetermined position, such as over the letter A in FIG. 4, the member 86 and therefore the cutting blade 4 are moved downwardly until the cutting blade 4 has penetrated through the material 58. Movement of the member 86 is continued until the stop collar 8 has been moved a distance away from the projection 20 so that the holder 6 is free for rotational and linear movement. The computer 76 continues to send out signals to move the carriages 70 and 66 over the rails 60; the carriage 80 over the rail 78 and the cutting blade 4 into and out of contact with the material 58 until the desired pattern, such as the letters A B C, has been cut in the material 58.

In those instances where it is desired to use the foot 40, it is positioned over the tube 16 and the set screw 46 is adjusted until the tip 48 is properly located, as explained above, in the keyway 34. The tube 16 is then mounted in the member 86 and the pattern is cut in the same manner as described above.

In the preferred embodiment of the invention, all of the parts of the cutting assembly 2 are formed of a high grade steel although other materials having similar physical characteristics may be used. The outer surface of the holder 6 is ground and polished so that any friction between the bearing means 22 and the holder 6 is minimal. The bearing means 22 comprise ball bearings with the surfaces of the balls providing the contact with the holder 6. While the computer controlled apparatus described above is preferred, it is to be understood that any type of apparatus capable of moving the cutting assembly over the desired pattern may be utilized. Using the apparatus described above, patterns have been cut in materials wherein cutting speeds in excess of 250 inches per minute have been obtained.

While the preferred embodiments of the invention have been illustrated and described herein, it may be otherwise embodied and practiced within the scope of the following claims.

What is claimed is:

1. A method for use in cutting a pattern in a material comprising:

supporting the material in which a pattern is to be cut on a surface and at a predetermined location;

providing a cutting instrument having a longitudinal axis about which said cutting instrument rotates;

providing a holder means and a first bearing means;

positioning said first bearing means within said holder means;

mounting said cutting instrument within said first bearing means to facilitate rotation of said cutting instrument relative to said first bearing means;

providing a housing means and a second bearing means;

positioning said second bearing means within and along the longitudinal extent of said housing means;

locating portions of said holder means within said housing means;

contacting portions of the longitudinal extent of said holder means with said second bearing means for a distance that facilitates relative longitudinal movement between said holder means and said housing means;

maintaining said holder means free from contact with a driving means for causing rotation of said holder means during rotation of said holder means about a longitudinal axis;

moving said cutting instrument, said holder means and said housing means relative to the material in order to cut the pattern; and changing the orientation of said cutting instrument relative to said material to be cut during the cutting operation by:

changing the direction of lateral movement of said housing means, rotating the entire longitudinal extent of said holder means about said longitudinal axis and relative to said second bearing means and moving said holder means longitudinally relative to said housing means using said same second bearing means, and pivoting said cutting instrument about contacting portions of said cutting instrument and said material to be cut, and about said longitudinal axis and relative to said first bearing means.

2. An apparatus for use in cutting a pattern in material, comprising:

a cutting instrument;

a first bearing means for use in facilitating rotation of said cutting instrument about a longitudinal axis wherein relative movement occurs between said cutting instrument and said first bearing means during rotation of said cutting instrument about said longitudinal axis;

a holder means for supporting said first bearing means and for internally receiving at least portions of said cutting instrument;

a housing means having a size greater than said holder means to internally receive at least portions of said holder means;

second bearing means extending within and along the longitudinal extent of said housing means for a desired distance, said second bearing means contacting said holder means wherein said same second bearing means facilitates rotational movement of said holder means about a longitudinal axis and facilitates linear movement of said holder means relative to said housing means, wherein the entire longitudinal extent of said holder means rotates about and moves along said longitudinal axis and relative to said housing means during a change in position of said cutting instrument, and wherein said cutting instrument pivots about contacting portions of said cutting instrument and said material to be cut during said change in position of said cutting instrument;

a first stop means connected to said housing means; and an adjustable second stop means connected to said housing means but separated and spaced from said first stop means, said first stop means and said second stop means being used to define the extent of linear moveability of said holder means relative to said housing means.

3. An apparatus, as claimed in claim 2, wherein:

said holder means includes adjustable contact means for use in engaging at least one of said first and second stop means.

4. An apparatus, as claimed in claim 3, wherein:

said first stop means includes a shoulder of a size for engaging said contact means and preventing movement of said holder means.

* * * * *